United States Patent Office 3,133,126
Patented May 12, 1964

3,133,126
AROMATIC HYDROCARBON SEPARATION
Raymond N. Fleck, West Covina, and Carlyle G. Wight, Fullerton, Calif., assignors to Union Oil Company of California, Los Angeles, Calif., a corporation of California
No Drawing. Filed Sept. 12, 1960, Ser. No. 55,203
21 Claims. (Cl. 260—674)

This invention relates to the separation of aromatic hydrocarbons, and in particular concerns a process for separating from each other aromatic isomers contained in hydrocarbon mixtures which are difficult to resolve by distillation, by selective adsorption on a particular type of solid adsorbent, namely a certain zeolitic metallo alumino silicate.

Aromatic hydrocarbons can be separated from non-aromatic hydrocarbons by selective adsorption of the aromatics on a granular adsorbent such as a partially dehydrated zeolitic metallo alumino silicate. Adsorptive separation is also possible between aromatic hydrocarbons having a different number of rings per molecule, since these have substantially different polarities. Monocyclic aromatics are generally less strongly adsorbed than bicyclic aromatics, and tricyclic aromatics are more strongly adsorbed than bicyclic aromatics. This is particularly true of the unsubstituted aromatics, such as benzene, naphthalene, and anthracene. There has been little use made of these latter differences in adsorbabilities, since the separation of aromatics according to the number of rings in the molecule usually is more readily accomplished by other means of separation such as distillation. However, there are many aromatic hydrocarbons which are difficult to separate by distillation, such as those which have boiling points within 10° F. of each other, and these cannot be separated by conventional adsorbents. Thus, for example, aromatic hydrocarbon isomers, i.e., substituted aromatic hydrocarbons which have the same aromatic nuclei and the same number of carbon and hydrogen atoms, usually will not exhibit enough difference in adsorbabilities with conventional adsorbents to make possible their separation by adsorption, and it is with such isomeric mixtures that distillation is most inefficient and ineffective in making a good separation because of the proximity of their boiling points.

Many important aromatics must be obtained in a high degree of purity in order to reduce contamination of the products which are prepared from them in subsequent processing. Distillation and crystallization have been used for the separation of some of these aromatic materials. Where distillation is impractical or impossible, as in the case of the above isomers, fractional crystallization is generally used as a means of separation. Some aromatics can be purified to the desired degree by a single crystallization, but frequently multiple fractional crystallization is required. In such fractional crystallization the operation is carried out in a series of batchwise operations including cooling of a mixture until a component is solidified, separating the solids from the mother liquor, re-melting, and recrystallizing until a material of the desired purity is obtained.

A demand has developed in recent years for individual aromatic isomers. For example, p-xylene is used in the manufacture of terephthalic acid, o-xylene is a raw material in the manufacture of phthalic anhydride, m-xylene is the starting material in the manufacture of isophthalic acid, and ethyl benzene is utilized in the manufacture of styrene. The conventional separation of each of the individual xylene isomers involves a combination of physical and chemical methods requiring extensive equipment, severe processing requirements and expensive repetition of treating steps to produce at best poor yields of marginally pure products. o-Xylene has been separated from other xylene isomers by extensive fractional distillation yielding an o-xylene concentrate which is still contaminated. The m- and p-xylenes are so similar in boiling points that separation by distillation is essentially impossible. p-Xylene has been separated from xylene mixtures by fractional crystallization which involves substantial investment cost and only a limited percentage, about 60 to 70 percent, of the p-xylene can be recovered without substantial sacrifices in purity. The presence of ethyl benzene greatly complicates the resolution of these isomers to obtain pure p-xylene. The formation of eutectic mixtures in the low temperature separation by crystallization of p-xylene results in mixed products and consequent low yields of the purer products.

It is accordingly an object of the present invention to provide a selective adsorption process for the separation from each other of close-boiling aromatic hydrocarbons, i.e., those which are difficult to separate by distillation, in the presence or absence of other fluids.

Another object is to provide a process to separate from each other two aromatic hydrocarbon isomers contained in a hydrocarbon mixture comprising the same.

A further object is to provide an improved process of such nature wherein a particular crude isomer mixture, such as one comprising two or more of the following isomers: ethyl benzene, o-xylene, m-xylene, and p-xylene, is separated into essentially pure component streams.

Other and related objects will be apparent from the following detailed description of the invention and various advantages not specifically referred to herein will be apparent to those skilled in the art upon employment of the invention in practice.

We have now found that the foregoing objects and their attendant advantages can be realized by a selective adsorption process involving the use of a particular zeolitic metallo alumino silicate adsorbent. More particularly, we have found that highly efficient separation from each other of close-boiling aromatic hydrocarbons contained in hydrocarbon mixtures comprising the same can be attained by contacting said hydrocarbon mixtures in either liquid or vapor phase with a solid granular partially dehydrated metallo alumino silicate with a zeolite X crystal structure and having a pore diameter greater than 7 A. as hereinafter more fully described, to obtain an unadsorbed or raffinate phase which is lean in the more readily adsorbed aromatic hydrocarbon and a solid adsorbent which is rich in the more readily adsorbed aromatic hydrocarbon. The latter can be desorbed from the rich adsorbent by any means, such as heat, reduction in pressure, or displacement exchange by a more or less readily adsorbable material, or any combination of these. Thus, the reduction in pressure or the displacement exchange may be carried out at a different temperature from the adsorption, or it may be carried out essentially isothermally, that is, at a temperature substantially the same as that maintained during contact with the feed mixture.

The adsorbent of the present invention is of the "molecular sieves" type, as described below, but it does not appear to act as a molecular sieve in the present process. Furthermore, all "molecular sieves" will not work in the present process. Our particular adsorbent has high capacity and remarkable selectivity, however, considering the difficulty of separating the close-boiling aromatics of this invention. The present invention thus provides a process for separating from each other aromatic hydrocarbons even though they are close-boiling, and even though they are isomers such as o-xylene, m-xylene, p-xylene and ethyl benzene. We have now found that even these close-boiling isomeric aromatic hydrocarbons with essentially the same polarity have sufficiently different adsorbabilities on our particular partially dehydrated zeolitic metallo alumino silicate to be completely separable by selective adsorption.

In the practice of the process of this invention a particular advantage over the prior art is found in the complete separation from each other of isomers which exist in any proportion in the hydrocarbon feed mixture. This is particularly significant where each of the two isomers is present to the extent of at least 10 percent of the feed mixture. Either the more readily adsorbed aromatic hydrocarbon or the less readily adsorbed aromatic hydrocarbon can be the major component of the feed mixture with equally effective separation being accomplished.

The process of the invention is broadly applicable to any hydrocarbon mixture comprising at least two different aromatic hydrocarbons which are difficult to separate by distillation. Usually, of course, such hydrocarbon mixtures are of petroleum origin, although they may be derived by the processing of oil shale, bituminous sands, coal and the like. They may also be synthesized by processes which yield petroleum-like hydrocarbon mixtures. The aromatic hydrocarbons particularly suited to the process of this invention will usually be isomers, as defined above, especially those in which the substituent groups are hydrocarbon groups containing not more than four carbon atoms each and contain the same number and kind of unsaturate bonds. This invention is especially applicable to alkyl aromatic isomers, i.e., those in which the substituent groups are saturated hydrocarbon groups. Among the most important of these are xylene mixtures. For these and other monocyclic aromatic hydrocarbon separations, the preferred adsorbents have pore diameters between about 7 A. and about 12 A.

The xylene mixtures from petroleum or coal tar ordinarily comprise the three xylene isomers and ethyl benzene and their composition will normally range within the following proportions: Ethyl benzene (10–20 percent), p-xylene (15–25 percent), m-xylene (40–60 percent), and o-xylene (15–25 percent), together with small amounts of non-aromatic hydrocarbons and non-hydrocarbon impurities. In the petroleum industry, as a specific example, a mixture of xylene isomers is obtained by hydroforming a gasoline fraction and then fractionating to obtain a close-boiling crude xylene cut.

The crystalline partially dehydrated metallo alumino silicates of this invention are conveniently prepared synthetically by heating stoichiometric quantities of alumina and silica with an excess of sodium hydroxide under pressure and thereafter washing out the excess caustic to obtain a sodium zeolite X crystalline absorbent of the approximate molecular structure of $6Na_2O \cdot 6Al_2O_3 \cdot 15SiO_2$ (on a water-free basis) and having a uniform pore diameter of about 13 A. The uniform pore diameter of this product is then altered by exchanging part of the sodium cation with other metals. For example, such product is treated with a concentrated solution of a calcium salt, e.g., calcium chloride, at superatmospheric pressure and at 150–300° C., washed with water to remove excess calcium chloride, and thereafter partially dehydrated by heating to obtain a synthetic zeolite X having a pore diameter of about 10 A. and having an average molecular structure (on a water-free basis) corresponding to

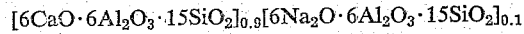
$[6CaO \cdot 6Al_2O_3 \cdot 15SiO_2]_{0.9}[6Na_2O \cdot 6Al_2O_3 \cdot 15SiO_2]_{0.1}$ This particular product is available commercially from the Linde Company, Tonawanda, New York, under the trade name "Molecular Sieves 10X." The sodium salt as described above, is also available from the same company, under the trade name "Molecular Sieves 13X." These commercial materials may contain substantial amounts of inert binder materials.

For the particular aromatic hydrocarbon separation of this invention the calcium substituted zeolite X crystal form of the metallo alumino silicate is preferred. Other cations may be introduced by ion-exchange to produce partially dehydrated zeolite X silicate crystals of a slightly different uniform pore diameter depending upon the specific metal ion. In the practice of this invention the preferred metal ions for this type of exchange are the divalent cations such as beryllium, magnesium, strontium, barium, zinc, cobalt, nickel, and calcium, although other salts such as the sodium, potassium, beryllium, silver, etc., may also be used. Further details regarding the manner of preparing the synthetic type of zeolite X adsorbent are to be found in British Patent No. 777,233.

The optimum particle size of the present adsorbents will depend upon the manner in which they are used in the process, i.e., as a fixed compact bed or as a moving compact bed, or a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with feed and displacement exchange fluid streams. In the simplest embodiment of the invention the adsorbent is employed in the form of a single static bed in which case the process is only semicontinuous. Preferably, a set of two or more static beds is employed in fixed-bed contacting with appropriate valving so that the feed stream is passed through one or more adsorbent beds while the displacement exchange fluid is passed through one or more of the other beds in the set. The flow of feed and displacement exchange fluid may be either up or down through the adsorbent, but preferably the feed is passed in one direction and the exchange fluid in the other. Any of the conventional apparatus employed in static bed fluid-solids contacting may be used. A moving compact bed of adsorbent has a much greater separation efficiency than a fixed compact bed of the same size because of the ability of the former to provide reflux. The moving compact bed is therefore preferable when an extremely high degree of separation is desired or when the feed mixture separation factor is poor.

The displacement exchange fluid utilized in the present process may be any fluid which, under the conditions of operation, is readily separated, e.g., by distillation, chilling, absorption, etc., from both the more readily adsorbed aromatic hydrocarbon and the less readily adsorbed constituents of the hydrocarbon mixture. Preferably, the displacement exchange fluid has a substantially different boiling point than the components of the hydrocarbon mixture. It may have an adsorbability in the process of this invention greater than, less than, or the same as the components of the hydrocarbon feed mixture, but preferably has an adsorbability of about the same magnitude as that of the adsorbed constituent of the feed mixture.

The measure of the effectiveness of adsorptive systems may be expressed in terms of a separation factor, alpha, which is defined as follows for two components, A and B:

$$\text{alpha} = \frac{\text{mol ratio } A/B \text{ in the adsorbed phase}}{\text{mol ratio } A/B \text{ in the unadsorbed phase}}$$

When the two phases are at equilibrium the alpha or separation factor is a measure of the degree of separation which is obtained in each theoretical stage of adsorption. By subjecting either of the phases from one stage to an additional separation stage, e.g., adsorption stages, a redistribution of the components is obtained to reestablish approximately the same ratio as defined by the component's separation factor. This process may be repeated until substantially 100 percent separation of the components is obtained. Thus when the separation factor is known for any given feed mixture, the number of theoretical stages required by any desired degree of separation may be readily calculated.

The greatest convenience in operation and, therefore, the preferred system occurs usually when the displacement exchange fluid and the adsorbed hydrocarbon have about the same degree of adsorbability, i.e., when the separation factor for the displacement exchange fluid and the adsorbed hydrocarbon component of the feed mixture is between about 0.1 and about 10.0. Preferred displacement exchange fluids are the aromatic compounds such as benzene, toluene, pyridine, and thiophene. Other components which may be employed include the n-olefins, n-paraffins, 1-chloroalkanes, 1-bromoalkanes, 1-fluoroalkanes, alpha-omega dihalo alkanes, n-alkyl amines, di-n-alkyl amines, di-n-alkyl sulfides, di-n-alkyl oxides, and the like.

As previously stated, the present process is carried out in either the liquid or vapor phase. Vapor phase is the preferred mode of operation, however, and in the vapor phase the operating temperature will be at least as high as the boiling point of the highest boiling component of the feed mixture at the particular pressure employed. This pressure is usually atmospheric but may be either sub-atmospheric or super-atmospheric. In general, the vapor phase and the liquid phase operations are normally carried out at temperatures between about 0° F. and 700° F.

As an illustration of the process of the invention in one of its simplest embodiments, a feed stream consisting of m-xylene and p-xylene is passed through a feed heater where the feed is vaporized at substantially atmospheric pressure. The vaporized feed stream at a temperature of about 350° F. then passes into a first adsorber containing a fixed bed of a solid granular partially dehydrated metallo alumino silicate adsorbent having a pore diameter of about 10 A., e.g., Linde Molecular Sieves 10X, and having adsorbed thereon the displacement exchange fluid (benzene) employed in a previous operational cycle. As the feed stream passes through said bed the m-xylene component of the feed is selectively adsorbed and the benzene exchange fluid is displaced. The less readily adsorbed p-xylene is withdrawn from this first adsorbed in the unadsorbed or raffinate phase which contains the displaced benzene as well as the non-adsorbed p-xylene from the feed stream. This raffinate or unadsorbed phase passes to a first distillation column from the bottom of which is withdrawn a fraction consisting essentially of p-xylene. The overhead fraction comprising essentially the benzene displacement exchange fluid which has been retained on the adsorbent in said first adsorber from the previous operational cycle is passed to the displacement exchange fluid manifold.

Simultaneously with the foregoing operation the adsorbent in a second adsorber is treated with the benzene displacement exchange fluid to desorb therefrom the m-xylene which was selectively adsorbed in the previous operational cycle. The benzene is taken from the displacement exchange manifold and passes downwardly through the adsorbent bed of said second adsorber at essentially the same conditions of temperature and pressure as those in said first adsorber and displaces therefrom the m-xylene which was adsorbed during the previous operational cycle leaving benzene adsorbed on the bed. The effluent from said second adsorber constitutes the extract phase and comprises a mixture of benzene and desorbed m-xylene. This extract effluent is passed into a second distillation column from the bottom of which is withdrawn a fraction comprising essentially m-xylene. The overhead fraction from this second distillation column consisting essentially of benzene is passed to the displacement exchange fluid manifold.

The foregoing description comprises a single operational cycle with adsorption of said m-xylene from the feed stream being carried out in the first adsorber and desorption of the said m-xylene by displacement exchange with benzene being simultaneously carried out in the second adsorber. Upon completion of this cycle, i.e., when the adsorbent in the first adsorber approaches saturation with m-xylene, the operations are reversed by switching the appropriate valves. Such operation places the first adsorber in the desorption part of the cycle and simultaneously places the second adsorber in the adsorption part of the cycle. In the next succeeding cycle the valves are again reversed. This particular embodiment of the process is thus a conventional adsorption operation with essentially isothermal adsorption and desorption being carried out alternately in each adsorber with substantially complete recovery of the feed mixture.

The use in the process of this invention of techniques such as recycling of product streams, multi-stage operation, multi-product moving bed systems, etc., will permit the economic production of components of the desired purity required for commercial practice, with the production, if required, of essentially pure component streams.

The process of this invention may also be combined with other separation techniques such as fractional crystallization, azeotropic distillation, absorption, etc. An example of such a combination operation comprises a separation by the process of this invention of a mixture of xylene isomers to produce a p-xylene rich stream which is then treated by fractional crystallization to remove the p-xylene crystals, recycling of the mother liquor from the p-xylene crystallization step to the adsorption step of this invention which allows complete recovery of the p-xylenes in an essentially pure component stream. Another example of such a combination involves (1) distilling to obtain a close-boiling fraction comprising the three xylenes and ethyl benzene, (2) using the adsorption of this invention to separate the para-xylene and ethyl benzene from the other xylenes and from each other, and (3) using distillation to separate the remaining meta-xylene from the remaining ortho-xylene.

The following experimental examples specifically illustrate the practice of the invention. The experimental apparatus used in Examples I to XVI consists of a buret open at the top to the atmosphere and sealed at the bottom to the top of a vertically mounted 1-inch diameter glass adsorption column, the bottom of which is sealed to a conventional laboratory water condenser vertically mounted. The adsorption column contains an 8-inch (40 gram) adsorbent bed. The adsorption column is jacketed to provide temperature control for the adsorbent bed. The jacket has tetralin vapor, at its boiling point and atmospheric pressure, flowing upwardly through it, which maintains the adsorbent bed at approximately 400° F. In each example except Examples VIII and XI an open graduate is placed directly beneath the bottom opening of the condenser to collect the effluent from the system. In Examples VIII and XI a standard vacuum distillation product receiver-condenser was attached to the bottom of the adsorption column. This apparatus provides a means of removing a cut or sample while maintaining the system under vacuum and continuing the flow of feed.

The experimental procedure used with this apparatus involves the controlled feeding of the feed mixture or displacement exchange fluid, in liquid form, through the stop cock of the buret onto the top of the hot absorbent bed where it is immediately vaporized and flows down in vapor form through the adsorbent bed. The vapor effluent from the bed flows downward into the water condenser and the condensate formed drains into the product receiver. The liquid flow rate into the system is held within the range of 0.2–0.5 ml. per minute for both the feed mixture and the displacement exchange fluid in every case.

In each example, except as noted in Examples XI to XVI, the adsorbent used was 1/16 inch extruded Linde 10X Molecular Sieves having about 25 percent inert binder material. The adsorbent bed was first brought to temperature and then saturated with the displacement exchange fluid by dripping displacement exchange fluid into the adsorber until it flowed out of the condenser. Then the displacement exchange fluid in the 10 ml. buret was replaced by a feed mixture. After introduction of about 10 ml. of feed mixture, displacement exchange fluid was substituted for the feed.

Since overall vapor holdup of the above described adsorption system is about 0.8 ml. (liquid volume) and the adsorbate loading capacity of the 40 grams of adsorbent is approximately 5 ml. (liquid volume), about 5 or 6 ml. of the first product obtained after starting flow of the feed mixture was displacement fluid. Starting with the flow of feed, 2.0 ml. product cuts were taken and analyzed until the displacement exchange fluid was again introduced. Then 5.0 ml. cuts were taken and analyzed for the remainder for the experiment. In the examples the first cut containing any constituents of the feed mixture is called the first product cut, e.g., in Example I the first product cut is Cut 5.

EXAMPLE I

In this experiment the feed mixture was 28.2 percent p-xylene, 67.8 percent m-xylene, and 4.0 percent o-xylene, and the displacement fluid was benzene. The results are shown in Table 1.

Table 1

SEPARATION OF P-XYLENE AND M-XYLENE

| Cut | Feed, Buret Reading, ml. | Volume of Cut, ml. | Cumulative Cut Volume, ml. | Analysis of Cut, Volume percent [1] | | | |
|---|---|---|---|---|---|---|---|
| | | | | p-xylene | m-xylene | o-xylene | benzene |
| Zeroed 10 ml. buret with feed | | | | | | | |
| 2 | 3.5 | 1.9 | 1.9 | | | | 100 |
| 3 | 4.6 | 2.0 | 3.9 | not run | not run | not run | not run |
| 4 | 6.8 | 2.0 | 5.9 | | | | 100 |
| 5 | 8.7 | 2.0 | 7.9 | 47.0 | 14.4 | 1.3 | 37 |
| 6 | 10.2 | 2.0 | 9.9 | 35.9 | 51.3 | 3.2 | 2.0 |
| Zeroed 25 ml. buret with benzene—start benzene exchange | | | | | | | |
| 7 | 5.5 | 5.0 | 5.0 | 15.8 | 41.3 | 2.4 | 37.6 |
| 8 | 11.5 | 5.0 | 10.0 | 3.4 | 19.5 | 0.9 | 69.6 |
| 9 | 15.8 | 5.0 | 15.0 | 1.3 | 11.8 | 0.6 | 84.3 |
| 10 | 20.0 | 5.0 | 20.0 | 0.7 | 9.0 | 0.4 | 86.6 |
| 11 | 25.0 | 5.0 | 25.0 | 0.4 | 6.4 | 0.3 | 89.6 |

[1] It may be noted that the figures do not add up to 100.0% in each case, but nevertheless the test method used gives results which are accurate relative to each other. To correct the above analytical data to a more exact volume percent, the tabulated figures for the four components in the effluent are added together and the sum is divided into 100 times each component's tabulated volume percent figure.

Table 2, the corrected benzene-free data from Table 1, graphically illustrates the selective adsorption of m-xylene as compared with that of its close-boiling isomer p-xylene. It also demonstrates the isothermal displacement exchange with benzene of the m-xylene in the rich absorbent.

Table 2

SEPARATION OF P-XYLENE AND M-XYLENE [a]

| Cut | Volume, Percent of Total Feed | Xylene Analysis (Benzene-free) Volume Percent | |
|---|---|---|---|
| | | Para | Meta and Ortho |
| 5 | 12 | 75 | 25 |
| 6 | 19 | 40 | 60 |
| 7 | 30 | 27 | 73 |
| 8 | 13 | 14 | 86 |
| 9 | 7 | 10 | 90 |
| 10 | 5 | 7 | 93 |
| 11 | 4 | 6 | 94 |

[a] As previously noted, the feed contained about 28 percent para-xylene and 72 percent meta and ortho xylene.

EXAMPLE II

In this run, the feed was a mixture of $C_8$ aromatics containing 50 percent ethylbenzene and 45 percent p-xylene, and the displacement fluid was benzene. The first product cut had a composition of 79 percent ethylbenzene on a benzene-free basis. This example illustrates the selective adsorption of the p-xylene as compared with ethyl benzene.

EXAMPLE III

In this run the feed was 52 percent m-xylene and 48 percent o-xylene, and the displacement fluid was benzene. The first product cut contained 56 percent o-xylene. This example illustrates the selective adsorption of m-xylene from a mixture containing its close-boiling isomer o-xylene.

EXAMPLE IV

This example illustrates the separation of a mixture containing 44 percent 1,3,5-trimethylbenzene and 56 percent 1,2,4-trimethylbenzene and the use of toluene as the exchange fluid. The feed mixture comprising the said trimethylbenzenes yielded a first product cut which had a 1,3,5-trimethylbenzene content of 82 percent.

EXAMPLE V

In this run the feed mixture was composed of 58 percent m-ethyl methyl benzene and 42 percent p-ethyl methyl benzene and the displacement exchange fluid was toluene. The easy separation of these close-boiling isomers was illustrated by the first product cut which contained 80 percent p-ethyl methyl benzene.

EXAMPLE VI

A feed mixture comprising 41 percent o-ethyl toluene and 59 percent 1,2,4-trimethylbenzene yielded a concentration of 68 percent o-ethyltoluene in the first product cut. Toluene was used as the displacement exchange fluid.

EXAMPLE VII

A mixture of cymene isomers was treated in the manner described in Example I with 1,3,5-trimethylbenzene used as the displacement exchange fluid. Table 3 illustrates the separation obtained.

Table 3

| | Cymene Analysis (1,3,5-trimethylbenzene-free basis) Volume Percent | |
|---|---|---|
| | Para and meta | Ortho |
| Feed | 65 | 35 |
| First Product Cut | 68 | 32 |

EXAMPLE VIII

This example illustrates the separation of the bicyclic isomers, 1-methylnaphthalene and 2-methylnaphthalene. The feed mixture (40.4 percent 2-methylnaphthalene, 59.1 percent 1-methylnaphthalene, and 0.5 percent naphthalene), was passed over the bed of 10X Molecular Sieves at an absolute pressure of 110 mm. of mercury. Table 4 shows the selective vapor phase adsorption of the 1-methylnaphthalene. The rich adsorbent bed was contacted with pyridine as the displacement exchange fluid.

Table 4

| Cut | Analysis of Cut (pyridine-free basis), Volume Percent | | |
|---|---|---|---|
| | 2-Methylnaphthalene | 1-Methylnaphthalene | Naphthalene |
| Feed | 40.4 | 59.1 | 0.5 |
| 1 | 60.2 | 39.3 | 0.5 |
| 2 | 51.5 | 47.8 | 0.7 |
| 3 | 43.5 | 56.4 | 0.1 |
| Pyridine exchange started | | | |
| 4 | 30.3 | 69.3 | 0.4 |
| 5 | 20.6 | 79.4 | 0.0 |
| 6 | 17.1 | 80.7 | 2.2 |

EXAMPLE IX

In this run acetonitrile was used as the exchange fluid in the separation of a mixture of diethylbenzenes. The o-diethylbenzene was much more readily adsorbed than the p-diethylbenzene and the p-diethylbenzene was more readily adsorbed than the m-diethylbenzene.

EXAMPLE X

When a hydrocarbon feed mixture containing about 30 percent p-xylene and about 70 percent m-xylene is used, the first cut containing xylenes has an analysis (benzene-free) of about 75 percent p-xylene and 25 percent m-xylene. When this 75 percent p-xylene cut is reprocessed in the same manner as the original feed mixture a correspondingly higher p-xylene purity is obtained. The final purity of the p-xylene rich effluent is about 99 percent after five successive stages of treatment.

EXAMPLE XI

In this run, conducted at the same conditions and in the same manner as previous Example VIII, the feed was 40 percent 2-methyl naphthalene and 60 percent 1-methyl naphthalene, the adsorbent was 13X Molecular Sieves, and the displacement exchange fluid was pyridine. The first product cut had a composition of 53 percent 2-methyl naphthalene (pyridine-free basis) which illustrates the selective adsorption on 13X Molecular Sieves of the 1-methyl naphthalene.

EXAMPLE XII

A separation conducted in the same manner and on the same xylene feed mixture as in Example I, except the adsorbent used is the strontium substituted zeolite X crystal form of the metallo alumino silicate rather than the calcium substituted form (10X Molecular Sieves), yields substantially the same separation results as Example I.

EXAMPLE XIII

Another run conducted in the same manner and on the same xylene feed mixture as in Example I, except the adsorbent is the magnesium substituted zeolite X crystal form of the metallo alumino silicate rather than the calcium substituted form (10X Molecular Sieves), yields substantially the same separation results as Example I.

EXAMPLE XIV

In an experiment conducted in the same manner as Example I, silica gel is substituted for the 10X Molecular Sieves adsorbent bed. The first product cut (benzene-free basis) is substantially the same composition as the xylene feed mixture.

EXAMPLE XV

Another experiment, conducted in the same manner as Example I, has activated carbon substituted for the 10X Molecular Sieves adsorbent bed, and yields a first product cut (benzene-free basis) which has substantially the same composition as the xylene feed mixture.

EXAMPLE XVI

In this example a commercial xylene cut from coal tar, containing 0.05 percent organic sulfur, 0.01 percent organic nitrogen, 2.0 percent non-aromatic hydrocarbons (paraffins, etc.), 15 percent ethylbenzene, 20 percent p-xylene, 50 percent m-xylene and 13 percent o-xylene, is the feed mixture. The adsorbent bed in this run is comprised of 40 grams of glass beads on top of 5 grams of 13X Molecular Sieves. The glass beads serve as a vaporizing media for the 100 ml. of the feed mixture passed through the bed. The effluent from the adsorbent bed is found to be essentially free of organic nitrogen and organic sulfur compounds but has substantially the same hydrocarbon composition as the feed mixture.

This effluent which has been contacted with the 13X Molecular Sieves bed is then used as the feed material for the adsorption-desorption of xylenes as in Example I. After 10 runs (about 10 ml. of feed each) with this effluent, there was no appreciable impairment of the selective adsorption of the xylenes on the 10X Molecular Sieves bed whereas without prior contacting of the commercial xylene feed cut with the 13X Molecular Sieves substantial deactivation is observed after 10 runs (about 10 ml. of feed each) which impairs the selective adsorption of the xylenes on the 10X Molecular Sieves. The non-aromatic hydrocarbon contaminants are relatively unadsorbed on the 13X and 10X Molecular Sieves and are concentrated in the first product cut.

EXAMPLE XVII

In this run essentially the same separation is obtained when the xylene feed mixture of Example I is contacted with the 10X Molecular Sieves at 600° F. and 50 p.s.i.g.

EXAMPLE XVIII

In this run a flask was fitted with an air-driven stirrer, a heating mantle, and a reflux condenser in order to permit agitation during the contact period and constant temperature control by refluxing isooctane. The adsorbent charge to the flask was 5 grams of powdered 10X Molecular Sieves (20–45 mesh) and the liquid charge consisted of 70 ml. of an isooctane solution containing 0.435 gram of 2.6-dimethylnaphthalene and 0.317 gram of 2,3-dimethylnaphthalene. The contact time was one hour for the above system at a temperature of about 210° F. and atmospheric pressure. The rich 10X Molecular Sieves adsorbent was then separated from the unadsorbed portion of the feed mixture by centrifuging. The unadsorbed liquid product (about 69 ml.) was found to contain 0.084 gram of 2,3-dimethylnaphthalene and 0.224 gram of 2,6-dimethylnaphthalene. The total dimethylnaphthalene isomer adsorption was about 9 grams of isomer per 100 grams of adsorbent. Thus, the 2,3-dimethylnaphthalene isomer was selectively adsorbed and the separation factor in this single stage adsorption was about 2.9 compared to a distillation separation factor of about 1.1 for these isomers.

EXAMPLE XIX

In this run, conducted in the same manner as Example XVIII, normal pentane was used as a solvent for the 2,3- and 2,6-dimethylnaphthalene isomers with an adsorption temperature (refluxing temperature of normal pentane) of about 97° F. and the run yielded substantially the same separation of these close-boiling isomers as was obtained in Example XVIII.

EXAMPLE XX

In this run, conducted in the same manner as Example XVIII, a 75 ml. isooctane solution of 0.324 gram of 2,6-dimethylnaphthalene and 0.476 gram of 2,7-dimethylnaphthalene yielded an unadsorbed liquid product containing 0.212 grams of 2,6-dimethylnaphthalene and 0.198 gram of 2,7-dimethylnaphthalene. Thus, the separation factor obtained was about 2.7 with the 2,7-dimethylnaphthalene being selectively adsorbed.

EXAMPLE XXI

In another run, conducted in the same manner as Example XVIII, an 80 ml. isooctane feed solution of 0.672 weight percent 1,4-dimethylnaphthalene and 0.548 weight percent 2,3-dimethylnaphthalene yielded an unadsorbed liquid product containing 0.675 weight percent 1,4-dimethylnaphthalene and 0.172 weight percent 2,3-dimethylnaphthalene which illustrates the highly selective adsorption on 10X Molecular Sieves of the 2,3-dimethylnaphthalene.

EXAMPLE XXII

In this run, conducted in the same manner as Example XVIII, a 70 ml. isooctane feed solution of 0.90 weight percent 2,6-dimethylnaphthalene and 0.92 weight percent 2-ethylnaphthalene yielded an unadsorbed liquid product containing 0.60 weight percent 2,6-dimethylnaphthalene and 0.55 weight percent 2-ethylnaphthalene. Thus, the separation factor obtained was about 1.35 with the 2-ethyl naphthalene being selectively adsorbed.

EXAMPLE XXIII

Another separation, conducted in the same manner as Example XVIII, processed a 70 ml. isooctane feed solution comprising 0.574 weight percent 2,3-dimethylnaphthalene and 0.498 weight percent 1,6-dimethylnaphthalene. The unadsorbed liquid product which resulted contained 0.237 weight percent 2,3-dimethylnaphthalene and 0.180 weight percent 1,6-dimethylnaphthalene. Therefore, this selective adsorption of 1,6-dimethylnaphthalene has a separation factor of about 1.24.

EXAMPLE XXIV

Another separation, conducted in the same manner as Example XVIII, of a 70 ml. isooctane feed solution containing, on an isooctane free basis, 66.7 weight percent 2-ethylnaphthalene and 33.3 weight percent 1-ethylnaphthalene yielded an unadsorbed liquid product enriched in the 2-ethylnaphthalene. This selective adsorption of the 1-ethylnaphthalene resulted in a separation factor of about 2.66.

EXAMPLE XXV

In this run, conducted in the same manner as Example XVIII, a 70 ml. isooctane feed solution comprising 0.612 weight percent 2,3-dimethylnaphthalene and 0.515 weight percent 1,2-dimethylnaphthalene yielded an unadsorbed liquid product containing 0.248 weight percent 2,3-dimethylnaphthalene and 0.136 weight percent 1,2-dimethylnaphthalene. Thus, the separation factor obtained was about 1.90 with the 1,2-dimethylnaphthalene being selectively adsorbed.

EXAMPLE XXVI

When an isooctane solution of a hydrocarbon feed mixture containing about 40 percent 1-normal propylnaphthalene and about 60 percent 2-normal propylnaphthalene is processed in the same manner as Example XVIII, the unadsorbed liquid fraction is found to be enriched in 2-normal propylnaphthalene indicating a selective adsorption of the 1-normal propylnaphthalene.

EXAMPLE XXVII

In this run, conducted at the same conditions and in the same manner as previous Example XVIII, the feed is an isooctane solution of 45 percent 1-normal butylnaphthalene and 55 percent 2-normal butylnaphthalene. The unadsorbed liquid product is found to be enriched in 2-normal butylnaphthalene illustrating the selective adsorption on 10X Molecular Sieves of the 1-normal butylnaphthalene.

EXAMPLE XXVIII

In this run, conducted in the same manner as previous Example XVIII, 70 ml. of an isooctane feed solution containing 0.479 weight percent 2-ethylnaphthalene and 0.566 weight percent 2,3-dimethylnaphthalene yielded an unadsorbed liquid product containing 0.228 weight percent 2-ethylnaphthalene and 0.163 weight percent 2,3-dimethylnaphthalene. The separation factor therefore was about 2.25 with the 2,3-dimethylnaphthalene being selectively adsorbed.

EXAMPLE XXIX

A separation, conducted in the same manner as Example XVIII, of a 65 ml. isooctane feed solution of 0.322 weight percent 1,7-dimethylnaphthalene and 0.811 weight percent 2,3-dimethylnaphthalene yielded an unadsorbed liquid product containing 0.156 weight percent 1,7-dimethylnaphthalene and 0.372 weight percent 2,3-dimethylnaphthalene. The adsorbent charge in this example was 4 grams of 10X Molecular Sieves rather than the 5 gram charge in Example XVIII. The separation factor obtained was about 1.11 with the 2,3-dimethylnaphthalene being selectively adsorbed.

EXAMPLE XXX

Another run, conducted in the same manner as Example XVIII, resolved a 70 ml. isooctane feed solution containing 0.503 weight percent 1,3-dimethylnaphthalene and 0.632 weight percent 2,3-dimethylnaphthalene to yield an unadsorbed liquid product containing 0.192 weight percent 1,3-dimethylnaphthalene and 0.182 weight percent of 2,3-dimethylnaphthalene. The separation factor was about 1.53 with the 2,3-dimethylnaphthalene being selectively adsorbed.

The present class of adsorbents has relatively strong adsorptive affinity toward highly polar compounds such as nonhydrocarbons, including ethers, thioethers, water, alcohol, mercaptans, heterocyclic nitrogen or sulfur compounds, etc. The presence of such compounds in the feed stream more or less interferes with the adsorption process of this invention and they should be removed prior to contacting the feed with the adsorbent. Water is especially harmful. Such removal can be effected in various ways, e.g., by contacting the feed with an inorganic halide such as copper chloride, calcium chloride, magnesium chloride or the like, or with a partially dehydrated metallo alumino silicate which is capable of selectively adsorbing such highly polar compound contaminants. All of these may be classed as dehydrating adsorbents. A partially dehydrated zeolitic metallo alumino silicate adsorbent of the present general type having a uniform pore diameter greater than about 12 A., e.g., 13X Molecular Sieves, is especially satisfactory for this purpose.

Although the deactivation of the silicate adsorbent bed is gradual, some deactivation may eventually occur. It is within the scope of this invention to reactivate the silicate adsorbent by high temperature contacting with a hot reactivating gas such as steam, flue gas, air, etc.

The hydrocarbon feed mixture may contain the displacement exchange fluid. In such event, a suitable amount of such displacement exchange fluid is periodically or continuously removed from the system in order to maintain a constant inventory of the exchange fluid.

As will be apparent, the process of the invention essentially comprises solids-fluid contacting operations, and any of the various techniques and equipment conventionally applied to such type of operation may be adapted to the practice of the invention without departing from the scope thereof. Thus, while it is often preferred to maintain the adsorbent in the form of a moving compact bed, i.e., as a solids-fluid contacting operation in which a compact bed of the adsorbent is passed successively through adsorption and desorption zones where it is concurrently or countercurrently contacted with the feed stream and the displacement exchange fluid, respectively, the process is, nevertheless, operable in the form of a fixed compact bed. Also, the solids-fluid contacting operation may be carried out employing fluidized techniques whereby the adsorbent is employed in relatively small particle size and is suspended by the flow of the fluid with which it is contacted. Other adaptable techniques and modifications will be apparent to those skilled in the art.

The rich adsorbent containing the adsorbed aromatic hydrocarbons may also be treated essentially isothermally to remove the adsorbed aromatic hydrocarbons, that is, at a temperature substantially the same as that maintained during contact with the feed mixture.

The desorption can also be conducted at a temperature substantially higher than the adsorbent temperature and said desorption may be conducted under a reduced pressure from that used during adsorption or any combination of these may be used to facilitate recovery of the more readily adsorbed aromatic hydrocarbon from the silicate adsorbent.

In the foregoing specification and in the appended claims the material to which the process of the invention is applied is described as a hydrocarbon mixture comprising certain hydrocarbon components. It is to be understood, however, that the term is meant to include mixtures of hydrocarbons containing small normally incident amounts of nitrogen, sulfur and oxygen components.

This application is a continuation-in-part of our prior co-pending application Serial No. 724,796, filed March 31, 1958.

Other modifications and adaptations which would occur to one skilled in this particular art are to be included in the spirit and scope of this invention as defined by the following claims.

We claim:

1. The process for treating a fluid hydrocarbon mixture comprising at least two isomeric alkyl-substituted naphthalenes in which the alkyl substituents contain from 1 to 4 carbon atoms, which process comprises: contacting said hydrocarbon mixture with a solid granular adsorbent consisting essentially of a partially dehydrated zeolitic metallo alumino silicate having pores of substantially uniform diameter between about 7 A. and about 13 A., whereby there is obtained a fluid raffinate phase comprising non-adsorbed components of said mixture and a solid rich adsorbent containing adsorbed components of said mixture, the ratio of said isomers in said fluid raffinate phase being different from the ratio of said isomers in said hydrocarbon mixture.

2. A process according to claim 1 wherein said adsorbent is a calcium sodium alumino silicate having a substantially uniform pore diameter of about 10 A.

3. A process according to claim 1 wherein said adsorbent is a sodium alumino silicate having a substantially uniform pore diameter of about 13 A.

4. A process according to claim 1 wherein said hydrocarbon mixture comprises 1-methylnaphthalene and 2-methylnaphthalene.

5. A process according to claim 1 wherein the hydrocarbon mixture comprises 1-ethylnaphthalene and 2-ethylnaphthalene.

6. A process according to claim 1 wherein said hydrocarbon mixture comprises at least two isomeric dimethylnaphthalenes.

7. The process for treating a fluid hydrocarbon mixture comprising at least two isomeric alkyl-substituted naphthalenes in which the alkyl substituents contain from 1 to 4 carbon atoms, which process comprises: contacting said hydrocarbon mixture with a solid granular adsorbent consisting essentially of a partially dehydrated zeolitic metallo alumino silicate having pores of substantially uniform diameter between about 7 A. and about 13 A., whereby there is obtained a fluid raffinate phase comprising non-absorbed components of said mixture and a solid rich adsorbent containing adsorbed components of said mixture; and treating said rich adsorbent to desorb the said adsorbed component therefrom as a fluid extract phase, the ratio of said isomers in said extract phase being different from the ratio of said isomers in said raffinate phase.

8. A process as defined by claim 7 wherein said adsorbent is a calcium sodium alumino silicate having a substantially uniform pore diameter of about 10 A.

9. A process as defined by claim 7 wherein said adsorbent is a sodium alumino silicate having a substantially uniform pore diameter of about 13 A.

10. A process as defined by claim 7 wherein said treatment of said rich adsorbent comprises contacting the same with a displacement exchange fluid which is readily separated from said extract and raffinate phases.

11. A process as defined by claim 7 wherein said contacting and treating steps are effected at a temperature above the boiling point of the highest boiling component of said mixture.

12. A process according to claim 7 wherein said hydrocarbon mixture comprises 1-methylnaphthalene and 2-methylnaphthalene.

13. A process according to claim 7 wherein the hydrocarbon mixture comprises 1-ethylnaphthalene and 2-ethylnaphthalene.

14. A process according to claim 7 wherein said hydrocarbon mixture comprises at least two isomeric dimethylnaphthalenes.

15. The cyclic process for treating a fluid hydrocarbon mixture comprising at least two isomeric alkyl-substituted naphthalenes in which the alkyl substituents contain from 1 to 4 carbon atoms, which process comprises: (1) contacting said hydrocarbon mixture with a solid granular lean adsorbent consisting essentially of a partially dehydrated zeolitic metallo alumino silicate having pores of substantially uniform diameter between about 7 A. and about 13 A. and having adsorbed thereon the displacement exchange fluid hereinafter defined, whereby there is obtained a solid rich adsorbent containing adsorbed components of said mixture and a fluid raffinate phase comprising non-adsorbed components of said mixture and desorbed displacement exchange fluid; (2) contacting said rich adsorbent with a displacement exchange fluid which is capable of displacing said adsorbed components from said rich adsorbent and which is readily separable from the said isomers, whereby there is obtained a solid lean adsorbent containing adsorbed displacement exchange fluid and a fluid extract phase comprising said adsorbed components and said displacement exchange fluid; (3) returning said lean adsorbent to step (1); (4) separately treating said extract and raffinate phases to separate said displacement exchange fluid therefrom; and (5) returning the separated displacement exchange fluid to step (2), the ratio of said isomers in said extract phase being different from the ratio of said isomers in said raffinate phase.

16. A process according to claim 15 wherein said adsorbent is a calcium sodium alumino silicate having a substantially uniform pore diameter of about 10 A.

17. A process according to claim 15 wherein said adsorbent is a sodium alumino silicate having a substantially uniform pore diameter of about 13 A.

18. A process according to claim 15 wherein said hydrocarbon mixture comprises 1-methylnaphthalene and 2-methylnaphthalene.

19. A process according to claim 15 wherein the hydrocarbon mixture comprises 1-ethylnaphthalene and 2-ethylnaphthalene.

20. A process according to claim 15 wherein said hydrocarbon mixture comprises at least two isomeric dimethylnaphthalenes.

21. A process as defined by claim 15 wherein, in steps (1) and (2), said hydrocarbon mixture and said displacement exchange fluid are contacted with said adsorbent in the vapor phase.

References Cited in the file of this patent

UNITED STATES PATENTS

| 2,881,862 | Fleck et al. | Apr. 14, 1959 |
| 2,882,243 | Milton | Apr. 14, 1959 |
| 2,958,708 | Fleck et al. | Nov. 1, 1960 |
| 2,978,407 | Tuttle et al. | Apr. 4, 1961 |